United States Patent [19]

Nebon

[11] Patent Number: 4,878,144
[45] Date of Patent: Oct. 31, 1989

[54] SOLID-STATE TRIP DEVICE OF A MOLDED CASE CIRCUIT BREAKER

[75] Inventor: Jean-Pierre Nebon, St. Martin-le-Vinoux, France

[73] Assignee: Merlin Gerin, France

[21] Appl. No.: 250,761

[22] Filed: Sep. 29, 1988

[30] Foreign Application Priority Data

Oct. 9, 1987 [FR] France ................................ 87 14084

[51] Int. Cl.⁴ .............................................. H02H 3/08
[52] U.S. Cl. ........................................ 361/96; 361/97; 361/2; 361/5
[58] Field of Search ...................... 361/2, 5, 87, 93, 95, 361/96, 97

[56] References Cited

U.S. PATENT DOCUMENTS

| 4,589,052 | 5/1986 | Dougherty | 361/96 X |
| 4,644,438 | 2/1987 | Puccinelli et al. | 361/96 X |
| 4,694,373 | 9/1987 | Demeyer | 361/96 |
| 4,733,321 | 3/1988 | Lindeperg | 361/97 X |
| 4,780,787 | 10/1988 | Dano et al. | 361/96 |

FOREIGN PATENT DOCUMENTS 2644422 11/1980 Fed. Rep. of Germany .
3612090 10/1987 Fed. Rep. of Germany .

Primary Examiner—Derek S. Jennings
Attorney, Agent, or Firm—Arnold, White & Durkee

[57] ABSTRACT

A solid-state trip device including an instantaneous trip device formed by arc detectors 46R, 44S, 46T located in proximity to the main contacts 17R, 17S, 17T of the circuit breaker 10. The light signals emitted by the arc detectors 46R, 46S, 46T are transmitted by optical fibers 48 to a light-sensitive electronic component which emits an arcing signal. This arcing signal causes tripping of the circuit breaker 10 only if a fault signal is present.

4 Claims, 1 Drawing Sheet

SOLID-STATE TRIP DEVICE OF A MOLDED CASE CIRCUIT BREAKER

BACKGROUND OF THE INVENTION

The invention relates to a solid-state trip device of a molded case electrical circuit breaker having per pole a pair of contacts, elastically urged into contact in the closed position of the circuit breaker and capable of separating by the action of an automatic operating mechanism on a fault, comprising sensors which generate fault signals which are a function of the currents flowing in the conductors protected by the circuit breaker, and a processing unit to which said fault signals are applied to generate a circuit breaker tripping order, when preset thresholds are exceeded, said order being time-delayed according to the value of the fault signals.

The contacts of an electrical circuit breaker must open cleanly to avoid any intermediate contact repulsion position, the contacts nevertheless being insufficiently separated for the arc drawn between the contacts to be extinguished. Continuance of the arc between the partially open contacts causes overheating and damage to the circuit breaker. Repulsion of the contacts takes place due to the effect of the electrodynamic forces when the current exceeds a preset repulsion threshold, this threshold depending on the configuration of the current in the circuit breaker and on the pole setting characteristics.

To be sure that a circuit breaker does not remain in an intermediate contact repulsion position, the tripping threshold on a fault is generally set to a value lower than that of the repulsion threshold. It is difficult and costly to achieve circuit breakers having perfectly defined repulsion and tripping threshold 20 to 50% lower than the repulsion threshold is frequently selected, which results in a considerable loss of selectivity.

The object of the present invention is to achieve a trip device whose tripping threshold and the repulsion threshold are the same.

Another object of the invention is to achieve a trip device providing instantaneous tripping when the circuit breaker detects a fault.

SUMMARY OF THE INVENTION

The trip device according to the invention is characterized in that an arc detector is associated with each pair of contacts to detect the light emitted by the arc drawn when the contacts separate, the arcing signals emitted by said arc detectors being applied to said processing unit to bring about instantaneous tripping when at the same time the fault signals exceed said preset threshold.

Any separation of the contacts, notably by electrodyanmic repulsion forces, causes a spark or an arc to form emitting a light which can easily be detected by optical sensors such as photoelectric components which are preferably located away from the arcing zone and connected to the latter by light conductors such as optical fibers. By locating, according to the invention, the arc sensors or detectors inside the molded case, disturbances due to outside light are avoided in a particularly simple manner. Subjecting instantaneous tripping of the circuit breaker to the simultaneous presence of an arcing signal and of a fault signal prevents spurious tripping due to the arcs drawn between the contacts when normal circuit breaker make and break operations are performed. It can easily be understood that detection of an arc and detection of a fault current do not require any great accuracy, since the light emitted by the arc is superabundant and the difference between a current capable of causing repulsion of the contacts and the rated circuit breaker current is very great. According to the configuration of the current or the pole characteristics, electrodynamic repulsion can occur on a single pair of circuit breaker contacts and it is important that this repulsion be detected by associating an arc detector with each pair of circuit breaker contacts. In the case of an optical fiber, the light emitted by any one of the circuit breaker poles can be collected by running this fiber through the various arcing compartments near the pairs of contacts, but it is conceivable to fit a detector at a location of the molded case enabling the light emitted by any one of the pairs of contacts to be seen through orifices made in the internal partitions of the molded case. Each pair of contacts can have associated with it an optical fiber transmitting the light to the processing unit.

By using light to detect contact repulsion, tripping before the contacts are separated by the effect of electrodyanmic repulsion is prevented and inversely instantaneous tripping of the circuit breaker is ensured as soon as repulsion of any one of the pairs of circuit breaker contacts occurs. The trip device on contact repulsion is advantageously associated, or performs in addition the usual long delay and short delay protective tripping on an overload or a fault of an amplitude lower than the circuit breaker repulsion threshold.

The solid-state trip device according to the invention comprises analog and/or digital processing circuits, since the instantaneous tripping circuit on contact repulsion is advantageously analog in order to have a very short response time. Subordination of instantaneous tripping to the simultaneous presence of an arcing signal and a fault signal can be accomplished by suitable means, notably by an AND circuit, which receives the two arcing and fault signals on its inputs.

The solid-state trip device according to the invention also provides instantaneous protection when the circuit breaker detects a fault. In this case it is important to achieve immediate breaking of the circuit breaker, independently from the short delay and long delay tripping circuits which provide a time delay compatible with the tripping selectivity. Making on a fault automatically gives rise to an arc on the contacts which is detected by the arc detectors and to an overcurrent indicated by a fault signal, causing the circuit breaker to break. The device according to the invention advantageous replaces time-delayed contacts which inhibit the instantaneous trip device after a certain time.

BRIEF DESCRIPTION OF THE DRAWINGS

Other advantages and features will become more clearly apparent from the following description of an illustrative embodiment of the invention, given as a non-restrictive example only and represented in the accompanying drawing in which the single FIGURE represents the block diagram of a trip device according to the invention.

DESCRIPTION OF THE PREFERRED EMBODIMENT

Figure 1:
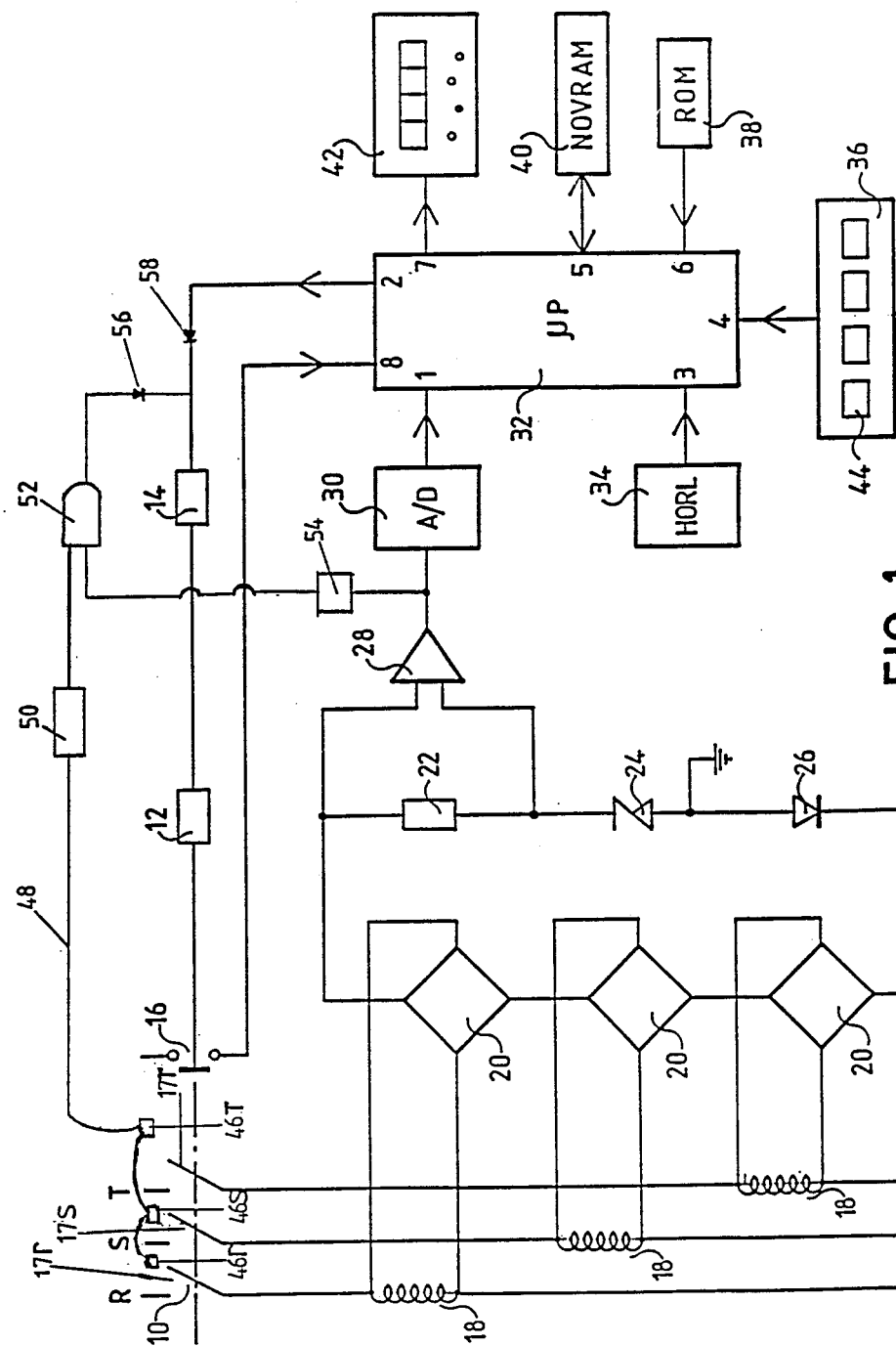

In the figure, an electrical power distribution system with 3 conductors R, S, T, supplying a load (not shown) comprises a circuit breaker 10 capable of interrupting the circuit in the break position. The mechanism 12 of the circuit breaker 10 is controlled by a polarized relay 14 controlling tripping of the circuit breaker in the event of an overload or short-circuit occurring. An auxiliary contact 16, associated with the main contacts 17R, 17S, 17T, of the circuit breaker 10 indicates the position of these main contacts 17R, 17S, 17T. Each conductor R, S, T has associated with it a current transformer 18 which delivers a signal proportional to the current flowing in the associated conductor, this signal being applied to a full-wave rectifier bridge 20. The outputs of the 3 rectifier bridges 20 are connected in series in a circuit comprising a resistor 22, a zener diode 24 and a diode 26 to produce at the terminals of the resistor 22 a voltage signal proportional to the maximum value of the current flowing in the conductors R, S, T, and at the terminals of the diode 24, a voltage supplying the electronic circuits. The voltage signal is applied to the input of the amplifier 28, whose output is connected to an analog to digital converter 30. The output of the analog to digital converter 30 is connected to an input 1 of a microprocessor 32. The microprocessor 32 comprises in addition an output 2 connected to the polarized relay 14, an input 3 receiving the signals from a clock 34, an input 4 connected to a keypad 36 with keys 44, an input 6 connected to a read-only memory ROM 38, an input-output 5 connected to a random access memory NOVRAM 40, an output 7 connected to a display device 42 and an input 8 connected to the auxiliary contact 16.

The trip device according to FIG. 1 performs the protection function, notably long delay tripping and/or short delay tripping, respectively, when an overload or fault occurs in the circuit of the conductors R, S, T. The digital signal representative of the maximum value of the current in the conductors R, S, T, is applied to the input 1 of the microprocessor 32 and compared with threshold values stored in a memory to detect any overshoot of these thresholds and to generate a delayed or instantaneous tripping order, which is transmitted to the relay 14 to bring about opening of the circuit breaker 10. The trip device can naturally perform other functions, notably earth protection. A trip device of the kind mentioned is well-known to those specialized in the art and is for example described in the U.S. patent application No. 07/077.420 filed on July 24, 87, which should be referred to advantageously.

The invention can be used in any solid-state trip device and is in no way limited to the trip device of the type described hereinabove. To give a non-restrictive example, the current detection means can comprise current sensors supplying analog signals representative of the current derivative di/dt and whose output is connected to integrated circuits, the output signals from the integrated circuits being transmitted to the microprocessor via an analog to digital converter. The solid-state trip device can also be of the analog type. According to the present invention, the circuit breaker 10 comprises an enclosure of the molded case type inside which the main contacts 17R, 17S, 17T, of the three circuit breaker poles are disposed. The three poles R, S, T are separated by walls defining internal compartments of the molded case and each pole has associated with it an arc detector 46R, 46S, 46R located in proximity to the main contacts 17R, 17S, 17T. The light collected by the arc detectors 46R, 46S, 46T is transmitted by an optical fiber 48 to a photoelectric component 50 which emits an electrical signal proportional to the light collected, this electrical signal being applied to an input of an AND circuit 52. The other gate of the AND circuit 52 is connected to a threshold circuit 54 connected to the output of the amplifier 28. The output of the AND circuit 52 is connected via a diode 56 to the polarized relay 14. A diode 58 is inserted in the connection between the output 2 of the microprocessor 32 and the polarized relay 14 to avoid any interference between the tripping signals applied to the polarized relay 14, respectively by the microprocessor 32 and by the instantaneous arc repulsion tripping circuit.

The solid-state trip device according to the invention operates as follows:

When an overload or fault occurs, the microprocessor 32 causes the circuit breaker 10 to trip in the usual manner, with a possible time delay. The separation of the contacts 17R, 17S, 17T, causes light to be emitted, detected by the arc detectors 46R, 46S, 46T, and transmitted by the optical fiber 48 to the photoelectric component 50 which applies a signal to the AND circuit 52. This AND circuit 52, which receives a fault signal on its other input, sends a superfluous tripping order to the polarized relay 14, the latter having already brought about tripping of the circuit breaker 10. This additional order does not disturb operation of the trip device.

In the event of a short-circuit current of high intensity greater than the repulsion threshold of the contacts 17R, 17S, 17T, or of any arc detected by the sensors 46R, 46S, 46T. The arcing signal applied to the AND circuit 52, which at the same time receives the fault signal transmitted by the amplifier 28 and the threshold circuit 54, generates a tripping order transmitted to the polarized relay 14. This tripping takes place instantaneously and causes the contacts of the circuit breaker 10 to open immediately thus avoiding any intermediate position of the contacts liable to cause overheating and damage to the circuit breaker. The detectors 46R, 46S, 46T located inside the molded case are shielded from the outside light and there is no risk of them causing spurious trips. They do however detect sparks or arcs occurring on the main contacts 17T, 17S, 17T, when normal make or break operations of the circuit breaker 10 are performed, notably by manual control, but the arcing signal is blocked by the AND gate 52, which does not receive a fault signal on its other input. Any spurious tripping and re-opening of the circuit breaker 10 is thus avoided and instantaneous tripping takes place only when repulsion of the main contacts 17R, 17S, 17T occurs. The short delay and long delay tripping thresholds can be selected close to the contact repulsion threshold, any operator error being excluded by the arc detection device according to the invention.

Inhibition of the instantaneous tripping arcing signal can of course be achieved by different means, notably by overload detectors independent from the sensors controlling the short delay and long delay tripping. The light conductor can be an optical fiber made of plastic material whose end close to the main contacts 17R, 17S, 17T is bared over a short length to pick up the arc light, the bared end of the fiber constituting the arc detector. Three independent fibers can of course be used, each one associated with one of the pairs of contacts, these three fibers controlling the light-sensitive electronic component 50 which can for example be a photodiode or a phototransistor. The bared end of the optical fiber 48 which constitutes the arc detector is preferably located in a zone shielded from the pollution due to the arc, or this end is arranged in such a way that it is cleaned by any appropriate means, for example mechanically, each time the circuit breaker operates.

The instantaneous arc detection trip device according to the invention can naturally be used in different types of standard trip devices, notably of the analog type.

The trip device according to the invention also provides instantaneous protection in the following way when the circuit breaker detects a fault:

When the circuit breaker 10 detects a fault, an arc occurs on the main contacts 17R, 17S, 17T and this arc is detected by the detectors 46R, 46S, 46T which emit an arcing signal applied to the AND gate 52. As detection of a fault takes place, the fault current is detected by the circuit 54 which sends a fault signal to the AND gate causing instantaneous tripping of the circuit breaker 10. In normal operation, the detectors 46R, 46S, 46T do not emit any signal and only the long delay and short delay trip devices provide protection.

The invention is naturally in no way limited to the embodiment particularly described hereinabove.

I claim:

1. A solid-state type device of a molded case electrical circuit breaker having a pair of contacts per pole, said contacts being elastically urged into contact in the closed position of the circuit breaker, and an automatic operating mechanism on a fault, capable of causing the separation of said contacts, comprising:
    sensors, which generate fault signals as a function of the currents flowing in the conductors protected by the circuit breaker;
    a processing unit to which said fault signals are applied to generate a circuit breaker tripping order, when preset thresholds are exceeded, said order being time-delayed according to the value of the fault signals; and
    an arc detector associated with each pair of contacts to detect the light emitted by the arc drawn when the contacts separate, the arcing signals emitted by said arc detectors being applied to said processing unit to bring about instantaneous tripping at the same time when the fault signals exceed said preset thresholds;
    wherein said processing unit comprises an AND circuit to whose inputs the fault signal and the arc signals are respectively applied.

2. The solid-state trip device according to claim 1, wherein said processing unit performs, in addition to said instantaneous trip, a long delay and short delay tripping function.

3. The solid-state trip device according to claim 1, wherein said processing unit comprises a light-sensitive electronic component connected to the arcing zone of the circuit breaker by one or more light conductors.

4. A solid-state type device of a molded case electrical circuit breaker having a pair of contacts per pole, said contacts being elastically urged into contact in the closed position of the circuit breaker, and an automatic operating mechanism on a fault, capable of causing the separation of said contact, comprising:
    sensors, which generate fault signals as a function of the currents flowing in the conductors protected by the circuit breaker;
    a processing unit to which said fault signals are applied to generate a circuit breaker tripping order when preset thresholds are exceeded, said order being time-delayed according to the value of the fault signals; and
    an arc detector associated with each pair of contacts to detect the light emitted by the arc drawn when the contacts separate, the arcing signals emitted by said arc detectors being applied to said processing unit to bring about instantaneous tripping at the same time when the fault signals exceed said preset thresholds;
    wherein said arc detector is formed by a bared end of an optical fiber which transmits light from the arcing zone of the circuit breaker to said processing unit.

* * * * *